Figure 1:
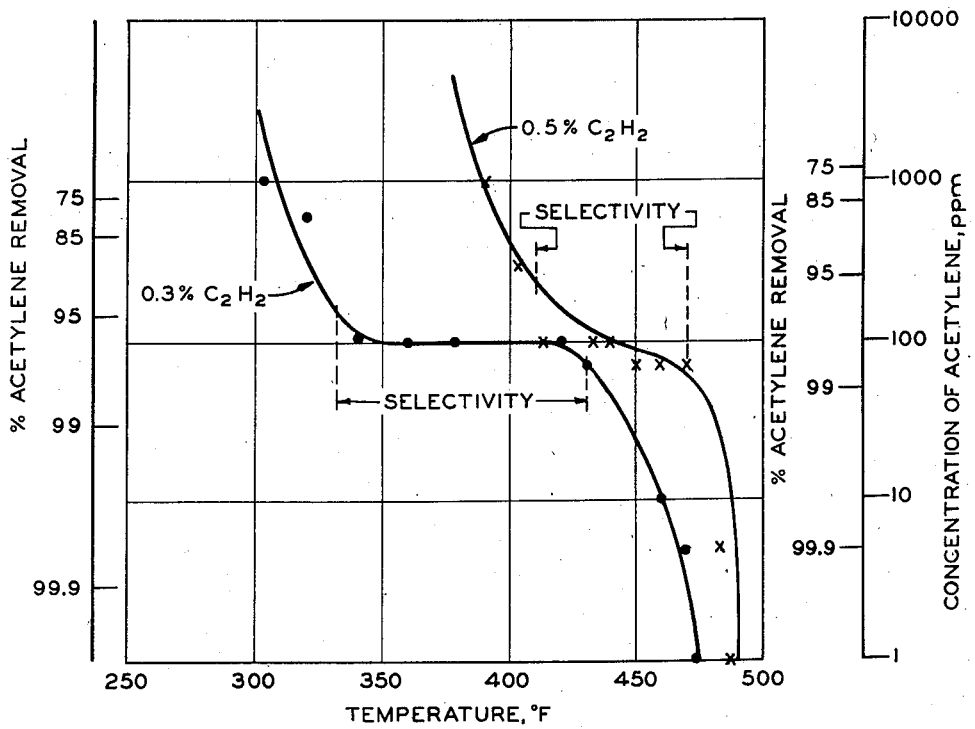
Figure 2:
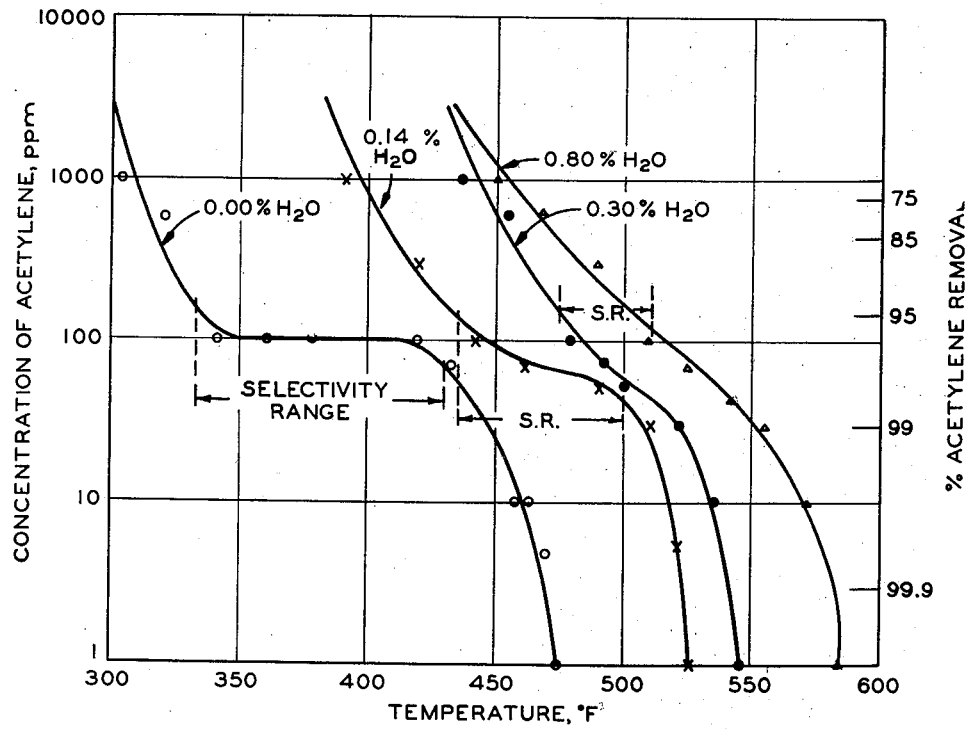

EFFECT OF ACETYLENE CONCENTRATION ON
HYDROGENATION-POLYMERIZATION SELECTIVITY.

EFFECT OF WATER CONCENTRATION ON
HYDROGENATION-POLYMERIZATION SELECTIVITY.

United States Patent Office 2,814,653
Patented Nov. 26, 1957

2,814,653

TWO-STEP PROCESS FOR THE SELECTIVE REMOVAL OF ACETYLENE FROM OLEFIN AND/OR DIOLEFIN CONTAINING HYDROCARBON STREAMS

Robert J. Hogan and Lloyd E. Gardner, Bartlesville, Okla., assignors to Phillips Petroleum Company, a corporation of Delaware Application September 13, 1954, Serial No. 455,558

19 Claims. (Cl. 260—677)

This invention relates to selectively removing acetylenic hydrocarbons from olefin- and/or diolefin-rich hydrocarbon streams. In one aspect this invention relates to decreasing the formation of polymeric material in a process for the selective removal of an acetylene from a mixture of hydrocarbons which also contains olefins and/or diolefins. In another aspect this invention relates to the selective removal of an acetylene from a hydrocarbon mixture, which also contains olefins and/or diolefins, in a two-step process without appreciable loss of said olefins and/or diolefins. In another aspect this invention relates to selectively removing the greater portion of an acetylenic hydrocarbon contaminant from a mixture of hydrocarbons, which also contains olefins and/or diolefins, in a first step and then effecting substantially complete selective removal of the remainder of said acetylenic hydrocarbon in a second step without appreciable loss of said olefin and/or diolefin in either of said steps. In still another aspect this invention relates to a plural-step process for selectively removing an acetylene from a mixture of hydrocarbons, which also contains olefins and/or diolefins, where in a first step of said process hydrogenation of said acetylene is caused to prevail over polymerization of said acetylene as opposed to hydrogenation plus polymerization. In still another aspect this invention relates to employing a catalyst in a first step of a two-step process for the selective removal of acetylenic hydrocarbons from a mixture of hydrocarbons which also contains olefins and/or diolefins under conditions such that said catalyst is selective to the hydrogenation of acetylenic hydrocarbons as opposed to hydrogenation plus polymerization of said acetylenic hydrocarbons. In still another aspect this invention relates relates to employing an alkalized iron oxide-chromium oxide catalyst in a two-step process for the selective removal of an acetylene from a mixture of hydrocarbons which also contains olefins and/or diolefins. Other aspects will be apparent from that which follows.

One of the usual methods of manufacturing olefins comprises passing a hydrocarbon material such as ethane, propane, butane, kerosene, or other hydrocarbon-rich streams through a heating zone where such hydrocarbons are decomposed with the formation of hydrogen and one or more unsaturated compounds such as olefins or diolefins. The maximum yield of unsaturated compounds is usually obtained when the operation is performed at high reaction temperatures; however, the use of high pyrolysis temperatures also results in the formation of acetylenic compounds which contaminate the product stream. Although the acetylenic compounds are usually present in such hydrocarbon streams in a minor amount, often less than 1 mol. percent, the acetylenic compounds are not readily removed without substantial loss of the more valuable olefin and diolefin constituents. For unlimited utilization of the olefin- and diolefin-rich streams, it is necessary that the removal of the acetylenic hydrocarbons be substantially complete.

One method of removing the acetylenic hydrocarbon contaminants from the olefin- and/or diolefin-rich streams involves contacting the contaminated mixture with a suitable catalyst at an elevated temperature to selectively remove the acetylenic hydrocarbon contaminants without appreciable loss of the olefin and/or diolefin constituents. This one-step process of selectively reacting the acetylenic hydrocarbon contaminants in a gas mixture containing, in addition, olefins, diolefins and hydrogen involves primarily, selective hydrogenation of the acetylenic hydrocarbons to olefinic and paraffinic hydrocarbons; however, a small proportion of the acetylenic hydrocarbons are also polymerized to form liquid and solid polymeric material. The accumulation of this polymeric material on the catalyst results in spalling and disintegration of the catalyst particles so that plugging of the catalyst bed eventually occurs. This destruction of the catalyst can be prevented by removing the polymeric material accumulated on the catalyst as a solid deposit by contacting the catalyst at relatively frequent intervals at an elevated temperature with an oxygen-containing atmosphere or by stripping the deposits from the catalyst with steam or a solvent. Thereafter, it is necessary to activate the catalyst again by reducing in an atmosphere of hydrogen at an elevated temperature, or by conditioning prior to re-use by treating said catalyst with an easily cokable material to deposit carbonaceous material thereon as described and claimed in our copending application Serial No. 478,042, filed December 28, 1954.

As pointed out above, both hydrogenation and polymerization take place when it is attempted to selectively remove acetylenic hydrocarbons in one step at a sufficiently elevated temperature to effect substantially complete removal. Further, substantial accumulation of polymeric material upon the catalyst frequently occurs during the course of a run. It is desirable to eliminate or reduce to a minimum the deposition of polymeric material upon the catalyst in order to avoid the necessity of reactivating the catalyst at frequent intervals.

We have now found that the deposition of polymeric material upon the catalyst can be mitigated by carrying out the said process in two steps rather than in one step. We have found that at relatively low temperatures hydrogenation of an acetylene in a mixture of hydrocarbons, which also contains other unsaturated hydrocarbons such as olefins and/or diolefins, will prevail over polymerization of said acetylene as opposed to hydrogenation plus polymerization of said acetylene. In other words, we have found that, while a given catalyst over a comparatively broad range of temperatures can be selective for said removal of acetylenes by hydrogenation plus polymerization, at relatively low temperatures the said catalyst can be selective to the hydrogenation reaction.

Thus, according to the invention there is provided a process for the selective removal of an acetylene from a mixture of gases containing, in addition, other unsaturated gases and hydrogen, which comprises: contacting said mixture of gases with a suitable catalyst under reaction conditions and at a relatively low temperature in a first step to effect a partial removal of said acetylene from said mixture, and then contacting said mixture of gases with a suitable catalyst under reaction conditions and at a relatively high temperature in a second step to effect substantially complete removal of said acetylene. Further according to the invention a suitable and presently preferred catalyst is an alkalized iron oxide-chromium oxide catalyst.

It is to be noted that the process of this invention involves two basic steps and comprises removal of acetylenic hydrocarbons by contact with an alkalized iron oxide-chromium oxide catalyst in a first step at a relatively low temperature, followed by a second contacting step at a relatively high temperature to remove essentially all of the remaining acetylenic hydrocarbons. The first or low temperature step is conducted in the presence of hydrogen and comprises selective hydrogenation of the acetylenic hydrocarbons. The second or higher temperature step is usually also conducted in the presence of hydrogen, although hydrogen is not required, and comprises removal of the remaining acetylenic hydrocarbons by a substantial amount of polymerization as well as by selective hydrogenation. The largest proportion of the acetylenic hydrocarbons, usually as high as 90–95 or 96 percent of the acetylenic hydrocarbons present, is removed in the first or low temperature hydrogenation step in which very little polymer is formed. Therefore, the deposition of solid material on the catalyst during this step is small. In the second step at relatively high temperature, the remaining acetylenic hydrocarbons, usually amounting to less than 10 percent and more often less than 5 percent of the acetylenic hydrocarbons originally present in the stream are removed, by hydrogenation plus substantial polymerization but the actual amount of solid material formed on the catalyst is small because of the low concentration of acetylenic hydrocarbons present in the contaminated stream. Thus, the total deposition of solid deposits in our acetylenic hydrocarbon removal process is reduced by: (1) removing the larger proportion of the contaminant acetylenic hydrocarbons in a first step under conditions such that the catalyst is selective to the hydrogenation reaction with very little deposition of solids on the catalyst; and (2) restricting the second step, necessarily carried out at higher temperatures in order to effect substantially complete removal and in which solids are deposited on the catalyst, to a hydrocarbon stream having a very low concentration of acetylenic hydrocarbon contaminants.

The acetylenic hydrocarbons, besides acetylene, which can be present in the gas treated according to the process of this invention include dimethylacetylene, methylacetylene, ethylacetylene and vinylacetylene. The concentration of these acetylenic hydrocarbons in the contaminated stream is usually less than 1.0 mol percent; however, streams containing higher concentrations of acetylenic hydrocarbons can also be treated.

A presently preferred catalyst for carrying out the process of the invention is an alkalized iron oxide-chromium oxide catalyst. The said catalyst can be prepared by mixing or grinding or promoting or impregnating iron oxide with chromium oxide and incorporating therein a suitable inorganic alkalizing agent, for example, one or more of the common alkalis, e. g., oxides, hydroxides and/or salts (e. g., carbonates) of the alkalis or even alkaline earth metals. The salt should be basic or convertible to a basic compound. Thus, a salt which is decomposable to the oxide is ordinarily employed. In the case of the alkaline earth compounds, salts hydrolyzable to the hydroxide may be used when water is added in the process of catalyst manufacture, e. g., just prior to extrusion. Herein and in the claims the various compounds of potassium or other alkali metal are alternatives of potassium hydroxide. Also, generally, the catalyst will have a composition in weight percent as follows: 0.5–50 potassium oxide, 1–40, preferably 1–30, chromium oxide and the remainder iron oxide. Preferably, the iron oxide will constitute the preponderant proportion of the catalyst. Thus, the iron oxide is the major active constituent preferably in excess of all constituents combined with the possible exception of a carrier. Thus a now preferred catalyst will contain approximately 65–95% iron oxide. Herein and in the claims the proportions given are with reference to the composition which is to be reduced with hydrogen, as later described, prior to use as the catalyst. The iron oxide and chromium oxide can be combined by thermally decomposing a mixture of the nitrates, by coprecipitating the oxides, or by mixing the hydrous gels. One particularly suitable method is to thoroughly mix by cogrinding a mixture of powdered iron oxide and powdered chromium oxide. This mixture is then formed into a paste by the addition of a solution containing the desired amount of potassium compound extruded or pelleted, dried, and calcined at a temperature between 700 and 1000° C. and preferably between 800 and 950° C. According to the invention the catalyst composition described is reduced with hydrogen at an elevated reducing temperature, for example, in the range 650 to about 1000° F. In a preferred embodiment of the invention the composition is subjected to the reducing conditions for a period of at least four hours. If desired the catalyst can be conditioned prior to use by treating said catalyst with an easily cokable material to deposit carbonaceous material thereon as described and claimed in copending application Serial No. 478,042, filed December 28, 1954.

The iron oxide can be prepared by calcining a precipitated iron oxide in the form of a powder at an elevated temperature, for example in the range 1475–1600° F. until its surface area has been reduced to below about 8 square meters per gram or until its density is equivalent to about 250 pounds per barrel. At this stage the iron oxide is of a brownish-red color and has a formula of $Fe_2O_3$. Further, calcination may be effected under reducing conditions in which event the iron oxide will be partly or completely in the form of black $Fe_3O_4$. Since the catalyst according to this invention is reduced at an elevated reducing temperature prior to use, at least some of the iron therein will be in the form of elemental iron although there may be present some incompletely reduced iron oxide.

The operating conditions or variables of this invention are more or less interdependent, particularly for the low temperature hydrogenation step, so that when one operating variable is arbitrarily fixed the limits within which the others may be varied are dependent thereon. The temperature employed in the low temperature hydrogenation step is broadly in the range of 300–500° F. However, the specific temperature used in a particular situation is determined from a consideration of the concentration of acetylenic hydrocarbons and the concentration of water in the contaminated stream to be treated. As shown in Figure I, an increasing concentration of acetylene in the contaminated gas increases the temperature required for the hydrogenation reaction and decreases the range of temperatures over which the reactions taking place are restricted to hydrogenation in preference to polymerization of the acetylene. Thus, when removing acetylene from a dry contaminated stream containing 0.3 mol percent acetylene hydrogenation of said acetylene will prevail over polymerization of said acetylene within a temperature range of approximately 332–430° F. (98°), but when the contaminated stream contains 0.5 mol percent acetylene the said range is approximately 410–470° F. (60°). With acetylene concentrations above about one percent, where a temperature of approximately 500° F. is required for 95–98 percent removal of acetylene, substantially all selectivity between hydrogenation and polymerization is lost.

The concentration of water in the contaminated stream has an effect similar to the concentration of acetylene, as shown in Figure II. For example, the reaction is selective to hydrogenation over polymerization within a temperature range of approximately 332–430° F. (98°) with a dry contaminated stream containing 0.3 mol percent acetylene, but with a contaminated stream of the same acetylene concentration the selectivity range is reduced to approximately 435–500° F. (70°) in the presence of 0.14 percent water and is reduced to approximately 475–510° F. (35°) in the presence of 0.30 percent water. The selectivity for hydrogenation over polymerization practically disappears whenever the water concentration becomes greater than 0.80 percent.

The pressure employed in the first or hydrogenation step can be in the range of 50–1000 p. s. i. g. and preferably is performed with a pressure of 200–600 p. s. i. g.

A space velocity in the first step within a range of 100–12,000 volumes of gas per volume of catalyst per hour can be used and preferably a gaseous hourly space velocity of 2000–4000 is used.

The hydrogen required for the hydrogenation reaction of the first step is usually present in the olefin- and/or diolefin-rich stream in sufficient amount that the addition of hydrogen is not necessary; in fact the concentration of hydrogen is usually in molecular excess of that required for hydrogenation of the acetylenic constituents to olefins. If desired or necessary, hydrogen can be added from an outside source.

The operating conditions employed in the second or polymerization step are also interdependent but not to the same degree as in the first or hydrogenation step. For the polymerization step, a temperature in the range of 450–700° F. is usually employed and the concentration of acetylenic hydrocarbons present has no appreciable effect on the reaction temperature. However, the concentration of water in the contaminated stream also affects the reaction temperature, as in the first or hydrogenation step, and the temperature ranges for contaminated streams of various water concentrations are as follows:

| Water content, percent | Broad range, °F. | Preferred range, °F. |
|---|---|---|
| 0.00 | 450–535 | 490–510 |
| 0.10 | 520–600 | 525–560 |
| 0.15 | 540–615 | 550–590 |
| 0.40 | 565–650 | 575–625 |
| 0.80 | 590–685 | 600–650 |

The water content of the gas feed to the second step can be higher than that to the first step; preferably, it will be in the range of 0.4 to 1.0 mol percent.

The ranges of pressure employed in the second or polymerization step are substantially the same as the ranges used in the first or hydrogenation step. The space velocity in the second step can be from 100–12,000 volumes of gas per volume of catalyst but is preferably within the range 2000 to 8000 volumes of gas per volume of catalyst per hour.

The polymerization step can be conducted in the absence of hydrogen; however, it is usually desirable that hydrogen be present in the reaction zone because the presence of hydrogen aids in preventing excessive deposition of polymeric material. The hydrogen remaining from the hydrogenation step is usually sufficient for this purpose.

The process is carried out under the above described operating conditions in conventional apparatus employed for contacting gases with solids. The following examples are illustrative of the process.

A cracked gas rich in olefins and containing 0.5 mol percent acetylene was contacted with a reduced alkalized iron oxide-chromium oxide catalyst at temperatures within low and high temperature ranges to determine the quantity of polymer formed and solid material deposited on the catalyst. The data for four examples are given in Table I.

In Example I, the acetylene removal reaction was conducted at low temperature in the presence of hydrogen to effect removal of 96 percent of the acetylene present in the cracked gas with the formation of liquid polymer and solid deposits amounting to 7.08 percent and 3.94 percent, respectively, of the reactant acetylene.

The data in Example II are the averages of a number of cycles of a run conducted at a high range of temperatures in the presence of hydrogen. In this example, the acetylene removal was substantially complete and the liquid polymer and solid deposits formed amounted to 16.8 percent and 11.7 percent, respectively, of the reactant acetylene.

The data of Example III are for one cycle of the run of Example II and the liquid polymer and solid deposits amounted to 20.2 percent and 16.0 percent, respectively, of the reactant gas.

The data in Example IV are for a high temperature

*Table I*

| Example | Pressure, p. s. i. g. | Sp. vel., v./v./hr. | Temp., °F. | $H_2O$ in feed (mol percent) | $C_2H_2$ removal (percent) | Avg. olefin loss (percent)[1] | Run time (hrs.) | Liquid polym. (percent of reactant acetylene) | Solid deposits (percent of reactant acetylene) |
|---|---|---|---|---|---|---|---|---|---|
| I | 400 | 3,000 | 420 | 0.00 | 96 | 0.0 | 24 | 7.08 | 3.94 |
| II | 400 | 3,000 | 525 | 0.1 | 99.99 | 0.0 | 24 | 16.8 | 11.7 |
| III | 400 | 3,000 | 600 | 0.1 | 99.99 | 0.8 | 24 | 20.2 | 16.0 |
| IV | 400 | 2,000 | 585 | 0.0 | 99.99 | 0.0 | 12 | 15.0 | 85.0 |

[1] Olefin loss is expressed as percent of the unsaturates in the feed other than acetylene. Unsaturates were generally about 40% (by volume).

reaction in the absence of hydrogen and show that it is more advantageous to conduct the high temperature step in the presence of hydrogen because the solid deposits in the absence of hydrogen amounted to 85.0 percent of the reactant acetylene in this run.

It is to be noted that for a two-step process, i. e., a first step at a relatively low temperature as in Example I followed by a second step at a relatively higher temperature as in Example III, the solid deposits in the second step would amount to only about 0.64 percent of the total reactant acetylene because approximately 96 percent of the reactant acetylene will be removed in the first step (Example I). The total solid deposits would then be about 4.58 percent for the two-step process (3.94+0.64). In comparison with a single step process, such as in Examples II and III, it is seen that the two-step process would effect a reduction in the overall solids deposits of 66–75 percent. This will result in greatly reduced catalyst deactivation and spalling, making possible longer runs on stream between catalyst reactivations. The substantial economies thus effected will be readily appreciated by those skilled in the art.

From the above it will be seen that the greatest benefits are realized from the invention when it is employed in treating hydrocarbon streams which contain less than 0.5 mol percent acetylene hydrocarbon contaminants and less than 0.3 percent water because of the effect of water vapor concentration on hydrogenation vs. polymerization selectivity in the first step. A higher water concentration would be preferred in the second step due to the desirable effect of water on solids deposition as described and claimed in copending application Serial Number 454,033, filed September 3, 1954. However the invention is not limited to such feed stocks because even with concentrations of acetylenes and water higher than those mentioned above our two-step process will show an advantage over conventional one-step processes. In those instances where the concentration of acetylene and/or water is higher than the said values the maximum temperature for the first or hydrogenation step is preferably 530° F. and more preferably, 500° F.

While the invention has been described as a two-step process the individual steps can be carried out in two or more stages if desired or necessary. For example, the low temperature or hydrogenation step can be carried out in two stages, where in each stage the maximum temperature would be determined according to acetylene concentration and water concentration as discussed above. The low temperature or hydrogenation step would then be followed by a high temperature or polymerization step as described above.

Also, while the invention has been described as employing the same kind of catalyst in both steps, it is within the scope of the invention to employ different catalysts in the several steps of the invention.

Herein and in the claims the term "substantially complete removal" refers to reducing the acetylene concentration to less than one part per million by weight.

Reasonable variation and modification are possible within the scope of the foregoing disclosure, the figures and the appended claims to the invention the essence of which is a plural-step process for selectively removing an acetylene from a mixture of hydrocarbons, which also contains olefins and/or diolefins, where in a first step of said process, carried out by contacting said mixture with a suitable catalyst, for example an alkalized iron oxide-chromium oxide catalyst, under reaction conditions and at a relatively low temperature, hydrogenation of said acetylene is caused to prevail over polymerization of said acetylene as opposed to hydrogenation plus polymerization of said acetylene, and where in a second step of said process, substantially complete removal of remaining said acetylene is effected by contacting said mixture with a suitable catalyst, for example an alkalized iron oxide-chromium oxide catalyst, under reaction conditions and at a relatively high temperature.

We claim:

1. A process for the selective removal of an acetylene from a mixture of hydrocarbons which comprises; contacting said mixture of hydrocarbons with a suitable catalyst, in the presence of hydrogen, under hydrogenation reaction conditions at a relatively low temperature in a first step to effect removal of a major portion of said acetylene and then contacting said contacted mixture of hydrocarbons with a suitable catalyst under hydrogenation plus polymerization reaction conditions at a relatively high temperature in a second step to effect substantially complete removal of remaining said acetylene.

2. A two step process for the selective removal of an acetylene from a mixture of gases, which also contains at least one of a substantial proportion of an olefin and a substantial proportion of a diolefin which comprises: contacting said mixture of gases with a suitable catalyst, in the presence of hydrogen, under hydrogenation reaction conditions at a relatively low temperature in a first step to effect removal of a major portion of said acetylene from said mixture and then contacting said contacted mixture of gases with a suitable catalyst under hydrogenation plus polymerization reaction conditions at a relatively high temperature in a second step to effect substantially complete removal of remaining said acetylene.

3. A process according to claim 2 wherein said mixture of gases contains a substantial proportion of an olefin and a substantial proportion of a diolefin in addition to said acetylene.

4. A process for selectively removing an acetylene from a mixture of hydrocarbons, which also contains other unsaturated hydrocarbons together with hydrogen, which comprises: in a first step, contacting said mixture with a suitable catalyst under hydrogenation reaction conditions and causing hydrogenation of said acetylene to prevail over polymerization of said acetylene, and then contacting said contacted mixture with a suitable catalyst in a second step under hydrogenation plus polymerization reaction conditions including a relatively higher temperature.

5. A process for selectively removing acetylenic hydrocarbons from a mixture of hydrocarbons, which also contains other unsaturated hydrocarbons together with hydrogen, which comprises: in a first step, contacting said mixture with a suitable catalyst under hydrogenation reaction conditions such that said catalyst is selective to hydrogenation of said acetylenic hydrocarbons as opposed to hydrogenation plus polymerization of said acetylenic hydrocarbons, and then contacting said contacted mixture with a suitable catalyst in a second step under hydrogenation plus polymerization reaction conditions including a relatively higher temperature.

6. In a process for selectively removing acetylenic hydrocarbon contaminants from a mixture of hydrocarbons containing, in addition to said acetylenic hydrocarbons, at least one of a substantial proportion of an olefin and a substantial proportion of a diolefin, together with hydrogen, and wherein polymeric material is deposited upon a catalyst employed in said process, the method of decreasing the total deposition of said polymeric material on said catalyst which comprises: contacting said mixture of hydrocarbons with said catalyst in a first step under hydrogenation reaction conditions at a relatively low temperature and then contacting said contacted mixture of hydrocarbons with another portion of said catalyst in a second step under hydrogenation plus polymerization reaction conditions at a relatively high temperature.

7. A process for selectively removing an acetylenic hydrocarbon contaminant from a hydrocarbon stream which also contains at least one of a substantial proportion of an olefin and a substantial proportion of a diolefin which comprises: contacting said mixture of hydrocarbons with a suitable catalyst, in the presence of hydrogen under hydrogenation conditions at a relatively low temperature within the range of 300–530° F.; a pressure within the range of 100–1000 p. s. i. g.; and a space velocity of 100–12,000 volumes of gas per volume of catalyst per hour to effect a partial removal of said contaminants; and then contacting said contacted mixture of hydrocarbons with another portion of said catalyst under hydrogenation plus polymerization conditions at a relatively high temperature within the range of 450–700° F., a pressure in the range of 100–1000 p. s. i. g., and a space velocity within the range 100–12,000 volumes of gas per volume of catalyst per hour to effect substantially complete removal of said contaminants remaining after said first contacting.

8. A process according to claim 7 wherein said catalyst is a reduced alkalized iron oxide-chromium oxide catalyst prepared by forming a mixture of iron oxide and chromium oxide, incorporating therein a suitable inorganic alkalizing agent which is one of an oxide, hydroxide, and carbonate of one of an alkali and an alkaline earth metal, and reducing the mass thus obtained in an atmosphere of hydrogen at an elevated temperature.

9. A process according to claim 8 in which iron oxide constitutes a predominant proportion of said catalyst.

10. A process according to claim 8 wherein said catalyst contains approximately 65–95 percent by weight iron oxide.

11. A process according to claim 1 wherein said catalyst is a reduced alkalized iron oxide-chlorium oxide catalyst.

12. A process according to claim 8 wherein: said catalyst contains by weight percent 0.5–50 potassium oxide, 1–40 chromium oxide and the remainder iron oxide, said catalyst having been reduced in the presence of hydrogen at an elevated temperature prior to use; said hydrocarbon stream contains not more than 0.3 mol percent water; said first mentioned contacting is carried out at a temperature within the range of 300–500° F.; and said second mentioned contacting is carried out in the presence of hydrogen and in the presence of water vapor present in a concentration of 0.4–1.5 mol percent.

13. A process according to claim 8 wherein: said hydrocarbon stream is dry and contains not more than 0.5 mol percent of said acetylenic hydrocarbon; said first mentioned contacting is carried out at a temperature within the range of 300–470° F.; and said second mentioned contacting is carried out in the presence of hydrogen and in the presence of water vapor present in a concentration of 0.4–1.5 mol percent.

14. In a process for selectively removing acetylenic hydrocarbon contaminants from a mixture of hydrocarbons containing, in addition to said acetylenic contaminants, at least one of a substantial proportion of an olefin and a substantial proportion of a diolefin, together with hydrogen, and wherein polymeric material is deposited upon a catalyst employed in said process, the method of decreasing the total deposition of said polymeric material on said catalyst, which method comprises: contacting said mixture of hydrocarbons with said catalyst in a first step under hydrogenation reaction conditions at a relatively low temperature such that said catalyst is selective to hydrogenation of said acetylenic contaminants, as opposed to hydrogenation plus polymerization of said acetylenic contaminants, to effect removal of a major portion of said acetylenic contaminants; and then contacting said contacted mixture of hydrocarbons with another portion of said catalyst in a second step under hydrogenation plus polymerization conditions at a relatively high temperature to effect substantially complete removal of said acetylenic contaminants remaining after said first contacting step.

15. A process according to claim 14 wherein said mixture of hydrocarbons contains not more than about 1 mol percent of said acetylenic contaminants.

16. A process according to claim 15 wherein at least 90 percent of said acetylenic contaminants are removed in said first contacting step.

17. A process according to claim 14 wherein said first contacting step is carried out at a temperature within the range of 300 to 530° F. and said second contacting step is carried out at a temperature within the range of 450 to 700° F.

18. A process according to claim 14 wherein said mixture of hydrocarbons contains not more than 0.5 mol percent acetylenic contaminants, said first contacting step is carried out at a temperature within the range of 300 to 470° F., and said second contacting step is carried out at a temperature within the range of 490 to 650° F.

19. A process according to claim 16 wherein said catalyst is a reduced alkalized iron oxide-chromium oxide catalyst prepared by forming a mixture of iron oxide and chromium oxide, incorporating therein a suitable inorganic alkalizing agent which is one of an oxide, hydroxide, and carbonate of one of an alkali and an alkaline earth metal, and reducing the mass thus obtained in an atmosphere of hydrogen at an elevated temperature.

References Cited in the file of this patent

UNITED STATES PATENTS

| | | |
|---|---|---|
| 1,836,927 | Linckh et al. | Dec. 15, 1931 |
| 2,359,759 | Hebbard et al. | Oct. 10, 1944 |
| 2,735,879 | Redcay | Feb. 21, 1956 |

FOREIGN PATENTS

| | | |
|---|---|---|
| 288,216 | Great Britain | Jan. 31, 1929 |
| 646,408 | Great Britain | Nov. 22, 1950 |